(12) United States Patent
Kiik et al.

(10) Patent No.: US 9,166,523 B2
(45) Date of Patent: Oct. 20, 2015

(54) LOW PROFILE SOLAR ROOF SHINGLE SYSTEM WITH INTEGRATED NANO-INVERTERS

(71) Applicant: Building Materials Investment Corporation, Dallas, TX (US)

(72) Inventors: Matti Kiik, Richardson, TX (US);
Daniel E. Boss, Murphy, TX (US);
Tommy F. Rodrigues, Nutley, NJ (US);
Sudhir Railkar, Wayne, NJ (US)

(73) Assignee: Building Materials Investment Corportion, Dallas, TX (US)

( * ) Notice: Subject to any disclaimer, the term of this patent is extended or adjusted under 35 U.S.C. 154(b) by 0 days.

(21) Appl. No.: 14/207,802

(22) Filed: Mar. 13, 2014

(65) Prior Publication Data
US 2014/0260001 A1    Sep. 18, 2014

Related U.S. Application Data

(60) Provisional application No. 61/789,877, filed on Mar. 15, 2013.

(51) Int. Cl.
| | |
|---|---|
| *E04D 13/18* | (2014.01) |
| *E04H 14/00* | (2006.01) |
| *H02S 20/25* | (2014.01) |
| *F24J 2/52* | (2006.01) |
| *H02S 40/32* | (2014.01) |

(52) U.S. Cl.
CPC . *H02S 20/25* (2014.12); *F24J 2/52* (2013.01);
*H02S 40/32* (2014.12); *Y02B 10/12* (2013.01);
*Y02B 10/14* (2013.01); *Y02E 10/50* (2013.01)

(58) Field of Classification Search
USPC ................ 52/173.3, 528; 136/244
See application file for complete search history.

(56) References Cited

U.S. PATENT DOCUMENTS

| | | | | |
|---|---|---|---|---|
| 5,990,414 | A * | 11/1999 | Posnansky | 136/244 |
| 8,371,076 | B2 | 2/2013 | Jones et al. | |
| 2005/0144903 | A1* | 7/2005 | Ceria | 52/782.1 |
| 2010/0146878 | A1* | 6/2010 | Koch et al. | 52/173.3 |
| 2010/0194202 | A1 | 8/2010 | Sun | |
| 2010/0313499 | A1* | 12/2010 | Gangemi | 52/173.3 |

(Continued)

OTHER PUBLICATIONS

AU Optronics Corporation. Ben Q Solar. "AC Unison PM250MAO. Photovoltaic Module with Microinverter." Feb. 2012.

(Continued)

*Primary Examiner* — Brian D Mattei
(74) *Attorney, Agent, or Firm* — Womble Carlyle Sandridge & Rice LLP

(57) ABSTRACT

A solar roof shingle for providing AC electrical power when exposed to sunlight includes a shingle frame having a bottom panel supportable on a roof deck, a top panel, and a thickness between the bottom panel and the top panel. The solar roof shingle also includes a solar collector mounted to and covering at least a portion to the top panel of the shingle frame, with the solar panel producing DC electrical energy at DC terminals when the solar collector is exposed to sunlight. A nano-inverter is disposed within the shingle frame between the bottom panel and the top panel and is electrically coupled to the DC terminals. The nano-inverter converts DC electrical energy to AC electrical energy available at AC terminals mounted to the shingle frame.

12 Claims, 3 Drawing Sheets

(56) References Cited

U.S. PATENT DOCUMENTS

| | | |
|---|---|---|
| 2011/0036386 A1 | 2/2011 | Browder |
| 2011/0225904 A1* | 9/2011 | Railkar et al. .............. 52/173.3 |
| 2011/0302859 A1* | 12/2011 | Crasnianski .............. 52/173.3 |
| 2012/0240490 A1* | 9/2012 | Gangemi .............. 52/173.3 |
| 2012/0317901 A1* | 12/2012 | Krause et al. .............. 52/173.3 |
| 2013/0111831 A1* | 5/2013 | Jenkins et al. .............. 52/173.3 |

OTHER PUBLICATIONS

BenQ AC Unison PM250MAO 260 Watt Solar Panel with Integrated Microinverter. http://civicsolar.com/product/benq-solar-ac-unison-pm250ma0-260-solar-panel, Apr. 2013.

Sun Power Launches New Ac Solar Panels with Integrated Microinverter Solution. http://us.sunpowercorp.com/about/news-room/press-releases/?re1ID=70579, Apr. 2013.

* cited by examiner

LOW PROFILE SOLAR ROOF SHINGLE SYSTEM WITH INTEGRATED NANO-INVERTERS

REFERENCE TO RELATED APPLICATION

Priority is hereby claimed to the filing date of U.S. provisional patent application 61/789,877 filed on Mar. 15, 2013.

TECHNICAL FIELD

This disclosure relates generally to solar energy systems and more specifically to a low profile solar roof shingle system for installation on the roof of a structure, such as a residential home, to generate usable AC voltage when the shingle system is exposed to sunlight.

BACKGROUND

There is a worldwide emphasis on expanding clean renewable energy sources. Solar energy is very abundant and harvesting that energy has been made more plausible by the continued development and improvement of photovoltaic cells and collectors in recent years. The cost of photovoltaic technology has declined significantly within the past decade, making it more affordable as an investment for the average homeowner. The electrical energy generated by these systems can either be used to supply local loads and/or integrated with a public utility grid, which may pay for the energy. In either case, a homeowner can realize a significant savings on electrical energy use. With the cost of photovoltaic systems continually falling, the payback period on an investment in a photovoltaic system is becoming shorter and shorter. To maximize the return on investment, a homeowner may increase the total power capacity by efficiently tiling a roof with as many photovoltaic collectors as possible.

Several types of photovoltaic collectors exist including solar cells, solar cell arrays, thin film photovoltaic, and others. Since all of these type collect energy from sunlight, such collectors will be referred to generally in this disclosure as "solar collectors."

An assembly of solar collectors on a roof often is traditionally called an array. The collectors within the array are designed to capture electromagnetic energy from the sun and convert this energy into direct current (DC) electrical energy. One standard wiring technique sometimes used within such an array is a combination of series and parallel connections to produce a desired DC voltage or "electrical energy" from the array. The DC electrical energy may be coupled to a remotely located main inverter that converts the DC electrical energy into the alternating current (AC) electrical energy required to integrate with a public utility grid or power home appliances. This traditional method of installation requires significant planning to insure that the voltage generated and current rating of the array are compatible with the inverter's operating specifications. This, in turn, requires knowledge of series and parallel electrical connections, and how to combine them within the photovoltaic array to produce a specific desired electrical output. This method also can pose a significant safety hazard since the DC outputs of the solar collectors are live during installation and can increase as additional collectors are added to the array to produce the final voltage and current capacity (i.e. the power rating) of the array. Another issue with DC arrays feeding a central inverter is that if one collector within a series or string of collectors is defective or becomes shaded, the DC voltage generated by the string of collectors is reduced or otherwise affected, which can cause problems at the central inverter.

Micro-inverters have been developed in recent years to address the safety issues, system design confusion, and performance issues related to DC solar collector arrays. Micro-inverters convert DC electrical energy from individual collectors or groups of collectors to AC electrical energy. DC-to-AC conversion thus occurs at the collector level rather than at the array level. The power matching between a collector and a micro-inverter is defined when selecting and purchasing collectors and inverters, and an installer need not be concerned with such matching issues. Once a collector's DC output is converted to AC, the connection between collectors within an array are simple parallel connections, making the array much easier to install. Moreover, once coupled to a solar collector, a micro-inverter will not produce electrical energy until directed to do so by a command code. This reduces the risk of electrical shock to installers, improving further the safety of installation. Furthermore, since the inversion is carried out at the collector level, if a solar collector or a nano-inverter fails, is defective, or shaded, the AC voltage produced by the array remains unchanged, albeit with perhaps slightly reduced current capacity.

A recent trend in the roof mounted photovoltaic industry is to offer a micro-inverter already mounted and wired to a photovoltaic collector to produce an "AC collector." Such AC collectors eliminate the need for mounting or connecting the inverters to the DC outputs of their collectors in the field. This can improve installation time and can add an even greater level of safety since an installer is not exposed to any live electrical energy during installation. Micro-inverters available for use in such typical large AC collectors, however, are typically optimized to operate at a collector's standard maximum power rating, which usually is between 190 Watts and 280 Watts. Since these micro-inverters operate at such high power, they tend to generate significant heat due to electrical resistance during operation, and therefore require sufficient air space and ventilation to dissipate the heat. This often requires the typical AC collector array to be raised above a roof deck by two to four inches, which some consider aesthetically unpleasing on a residential home. In addition, the standard AC collectors are generally large in size (3'×5') and this can pose aesthetic as well as installation problems. For instance, the large size generally limits the number of collectors that can fit on a given roof and can make handling and installation difficult on steep sloped roofs, especially in windy conditions.

There is a need for a much smaller AC solar roof shingle that resembles traditional roof shingles in size and shape and that can be installed directly on a roof deck and integrated into a field of standard shingles with aesthetically pleasing results. Such a roof shingle should operate efficiently with minimum required ventilation around the inverters of the collectors. It is to the provision of such a solar roof shingle and a solar roof system incorporating same that the present invention is primarily directed.

SUMMARY

U.S. provisional patent application 61/789,877 to which priority is claimed above is hereby incorporated by reference in its entirety.

Briefly described, a solar roof shingle is disclosed for generating AC electrical energy when exposed to sunlight while mimicking the size and appearance of a traditional roofing shingle. The shingle includes a shingle frame having a bottom panel supportable on a roof deck, a top panel, and a thickness between the bottom panel and the top panel. The shingle frame has dimensions that are substantially the same as or compatible with a traditional roofing shingle and a thickness that can be less than one inch. One or more solar collectors is mounted to and covers at least a portion of the top panel, preferably the "exposure portion" or the portion that is exposed after installation. The solar roof shingle also has a "headlap" portion above the exposure portion that is overlapped by the exposure portion of a like solar roof shingle in a next higher course of shingles in an installed array. The solar collector converts incident sunlight to DC electrical energy available at DC terminals, which may extend through the shingle frame. Because of the smaller size of the solar collector compared to those of prior art solar panels with dimensions measured in feet, the DC power rating of the collector and thus of an individual solar roof shingle is significantly reduced compared to prior art solar panels.

A nano-inverter is positioned within the shingle frame between the bottom panel and the top panel with its input coupled to the DC terminals of the solar collector. The nano-inverter is configured to convert the DC electrical energy generated by the collector to AC electrical energy, which is made available at AC couplers of a connection wire or mounted to the shingle frame. Since the DC power rating of the solar collector is significantly less than required for prior art solar panels, the maximum power rating of the nano-inverter can be substantially less than that of traditional micro-inverters used with prior art solar panel systems. As a result, heat generated by the nano-inverters during operation is substantially less that that produced by micro-inverters during operation. This allows the solar roof shingle of the present invention to be thin, sized to match or complement a traditional roofing shingle, and mounted directly to a roof deck integrated with a field of traditional shingles.

The invention will be better understood upon review of the detailed description set forth below taken in conjunction with the accompanying drawing figures, which are briefly described as follows.

DETAILED DESCRIPTION

Figure 1:
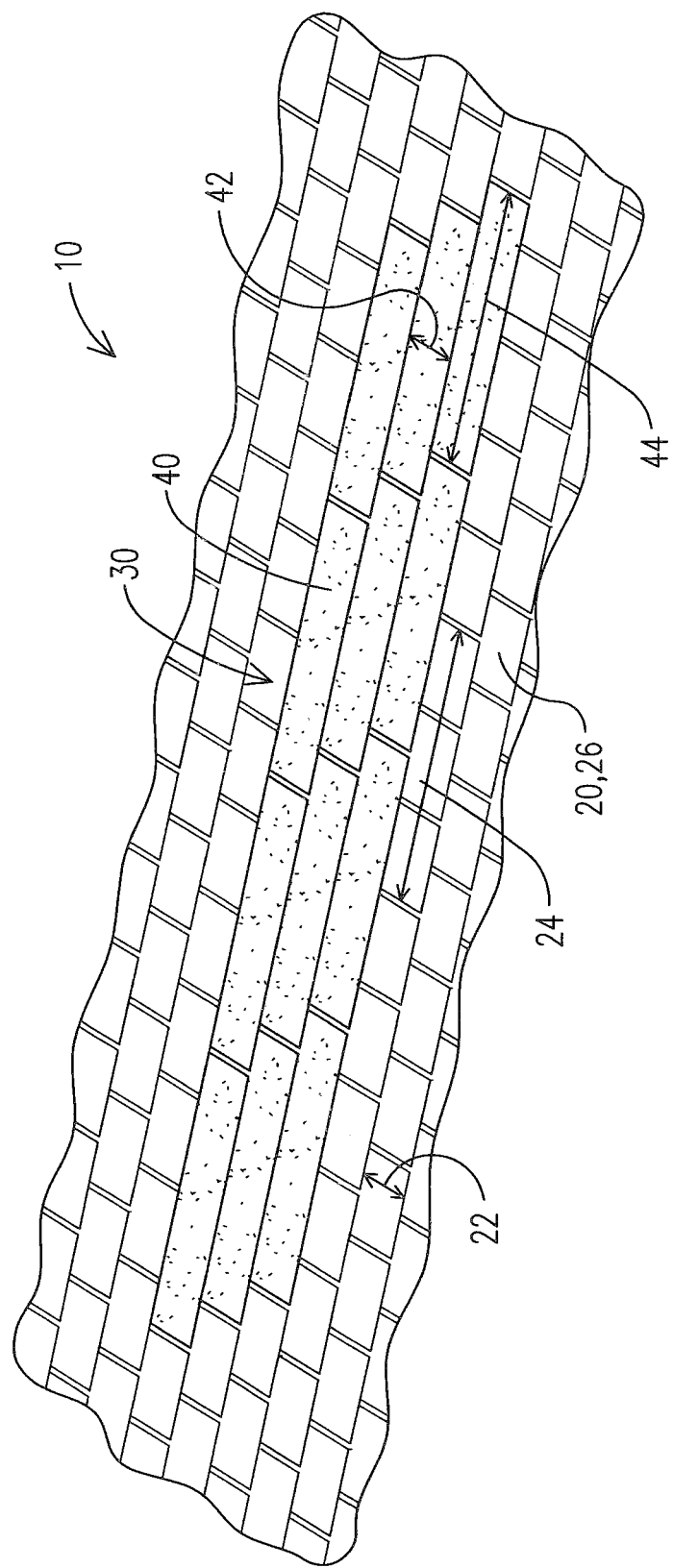
FIG. 1 is a perspective view of a solar roof shingle system for generating electrical energy, in accordance with one representative embodiment.

Referring now in more detail to the drawing figures, wherein like parts are identified with like reference numerals throughout the several views, FIG. 1 illustrates a solar roof shingle system 30 installed on a roof according to the present disclosure. The system 30 includes a plurality of AC solar roof shingles 40 each having an exposure portion with a width 42 and a length 44. The width of the exposure portion 42 and the length of the solar shingle 44 preferably are substantially the same as the exposed width and length of standard non-solar roof shingles 20, such as asphalt shingles 26 used as roof coverings for residential homes. For example, the width of the exposure portion 22, also known as the "exposure," of the traditional roofing shingle 20 may be from about five (5) inches to about eight and one-quarter (8¼) inches depending upon shingle type, and the length 24 may be about thirty-six inches. Other dimensions are, of course, possible.

In any event, the solar roof shingles 40 of the present disclosure preferably are sized to match or at least to be similar in exposure and width to the traditional shingles of the field in which the solar roof shingles are installed. In contrast to existing AC solar roof panels, the solar roof shingles 40 of the present invention are also configured to mount substantially flush against the decking or underlayment of the roof. Accordingly, the solar roof shingles 40 may be intermixed with the traditional non-solar roof shingles 20 in such a way that the solar roof shingles are somewhat hidden within a field of traditional shingles or at least present an architecturally pleasing appearance. The solar roof shingles 40 also are weather resistant so that, when installed with traditional shingles, seamless roofing protection is obtained across the area of the roof. The solar roof shingles 40 are electrically interconnected during installation to produce, when exposed to sunlight, AC electrical energy for use by the homeowner or integration with the public utility grid.

It is to be appreciated that reducing the size of presently available AC solar collectors is not a purely aesthetic endeavor, since reducing the size of the collector also reduces its total electrical output. This requires that the micro-inverters currently available in the art also be redesigned to function at such lower output levels, leading to the development of the nano-inverter. In addition, the integration of low power nano-inverters within shingle-sized AC solar roof shingles mounted directly to a roof deck requires that the nano-inverters operate within a small volume having limited air space and limited circulation available for cooling. The solar roof shingles also must couple both electrically and mechanically with other solar roof shingles to form a solar roof shingle array 30 while providing a continuous layer of weather protection for the roof. Finally, the design of the solar roof shingle must obtain a premium aesthetic when installed on a shingled roof.

Figure 2:
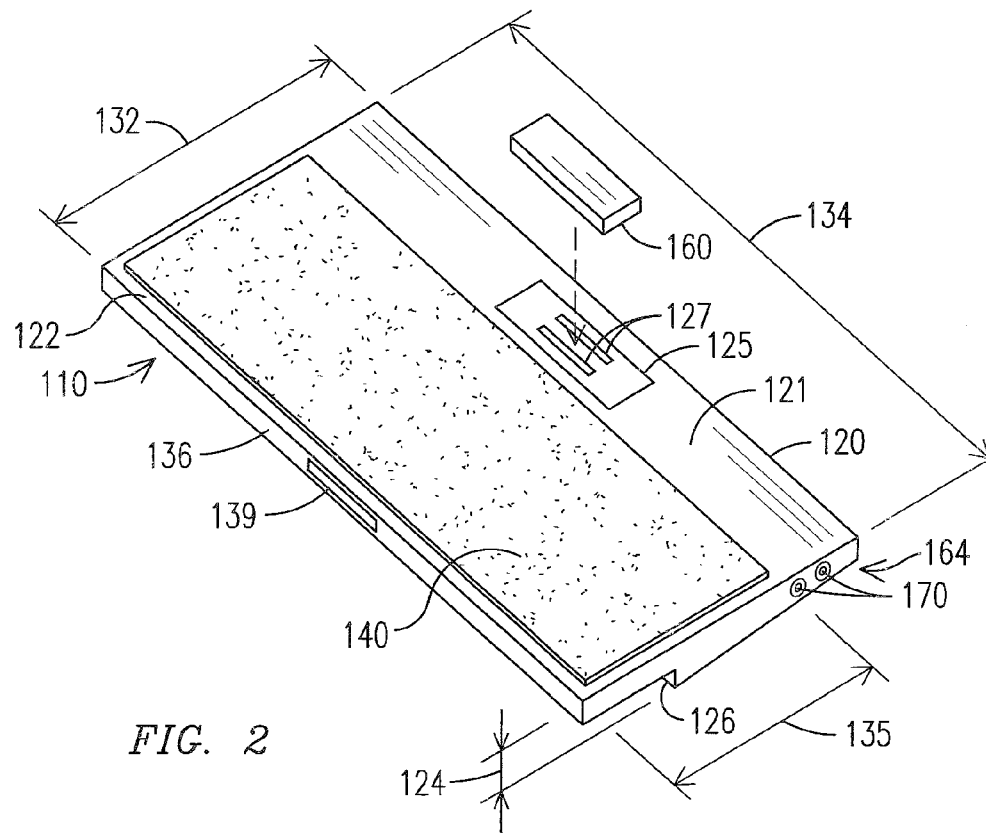
FIG. 2 is a perspective view of a single solar roof shingle according to another representative embodiment.
Figure 3:
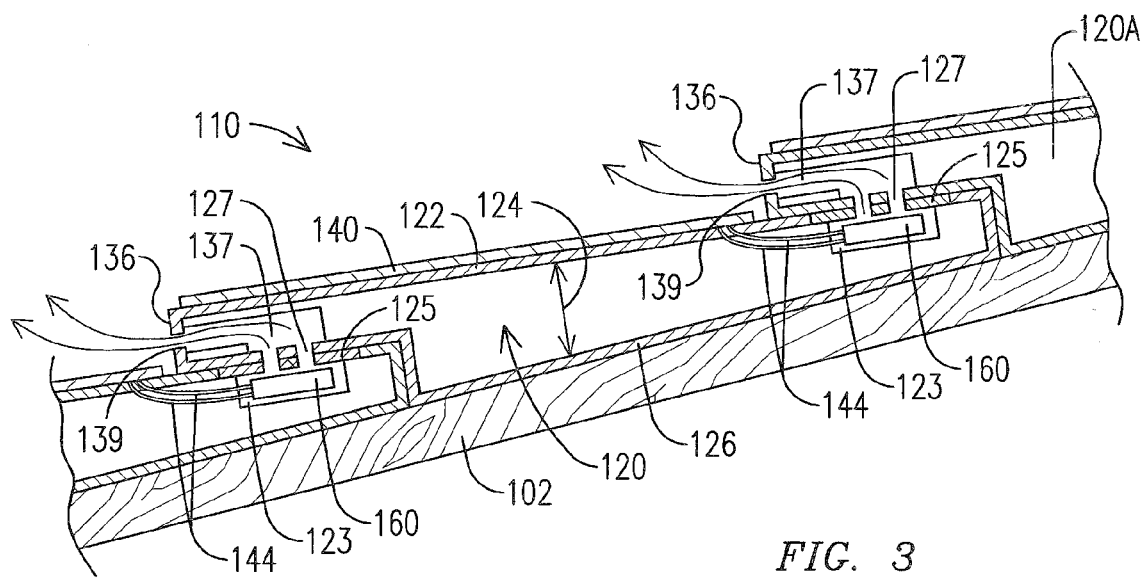
FIG. 3 is a cross-sectional schematic view showing a plurality of solar shingles of FIG. 2 mounted on a roof deck.

One representative embodiment of a solar roof shingle according to the present invention is shown in FIGS. 2 and 3. The solar roof shingle 110 includes a shingle frame 120 having a bottom panel 126 supportable on a roof deck 102, a top panel 122, and a thickness 124 between the bottom panel and the top panel. The shingle frame 120 also has a total width 132, an exposure width 135, and a length 134 that are substantially the same as those of a traditional asphalt shingle with which the solar roof shingles are to be used. The bottom panel 126 of the shingle frame 120 can be substantially continuous across the width 132 and length 134 of the shingle frame 120 to provide a continuous barrier for protecting the deck 102 of the roof from moisture, rain and snow. A solar collector 140 is mounted to and covers at least a portion of the exposure of top panel 122. The solar collector 140 produces DC electrical energy when exposed to sunlight and this energy is available at DC terminals 144, which may extend through the shingle frame 120. The top panel 122 of the frame 120 can be substantially continuous to provide structural support for the frame 120 and the solar collector 140 mounted to the exposure portion of the frame.

The solar roof shingle 110 further includes a nano-inverter 160 positioned within an appropriately sized cavity in the shingle frame 120 between the bottom panel 126 and the top panel 122. The inputs of the nano-inverter are electrically coupled with the DC terminals 144 of the solar panel 140. In one aspect, the nano-inverter 160 is configured to convert the DC electrical energy to AC electrical energy and to output the AC electrical energy through AC terminals or couplers 164 mounted to the shingle frame 120. The couplers also may terminate connector wires 264 (FIG. 4) as an alternate embodiment. Since the solar collector 140 mounted to the top panel 122 of the shingle frame 122 is significantly smaller than the large 3'×5' solar collector commonly used with currently available AC solar panels, the electrical power capacity of the solar collector 140 is significantly lower than the standard solar collector and typically may range anywhere from 10-150 Watts. Accordingly, the nano-inverter 160 may be configured to operate at lower power levels, which reduces significantly the heat generated by the nano-inverter during operation relative to prior art micro-inverters. This, in turn, reduces the cooling and thus the ventilation required beneath the solar roof shingle to dissipate the generated heat.

The significantly smaller size of the solar roof shingle 110 also can greatly reduce the weight of each individual shingle, while the narrower exposure width 126 make the handling the shingle 110 much easier. This can result in safer installations, especially on steep slope roofs. The smaller footprint of the solar roof shingle 110 further allows an installer to fit more collectors into a given roof area, thereby maximizing the power capacity of a solar roof shingle array and improving the homeowner's rate of return.

Even with the reduction in heat generated by the nano-inverters 160, at least some ventilation and cooling of the nano-inverters may be required. Such ventilation can be active or passive. This can be problematic since the nano-inverters may be substantially contained within a confined space between the bottom panel 126 and the top panel 122 of the shingle frame 120. For example, the nano-inverter 160 of the solar roof shingle 110 shown in FIGS. 2-3 may be located within a pocket 123 formed within a headlap portion 121 of the shingle frame 120. The pocket 123 may be covered with a pocket cover 125 after the nano-inverter is installed and connected to the DC terminals of the solar collector 140. In addition, the headlap portion 121 of the shingle frame 120 that contains the pocket 123 will normally be covered by the exposure portion of a like shingle frame 120A in a next higher course of solar roof shingles or by a traditional asphalt shingle. Either of these may be structurally bounded to the headlap portion of the underlying shingle frame 120A. All of this thwarts the efficient dissipation of the heat that is generated by the nano-inverter.

One solution to the above problem discovered by the inventors is to provide ventilation for the nano-inverter through the front or forward edge of the shingle frame. In the embodiment shown in FIGS. 2-3, for instance, the pocket cover 125 may be provided with vent openings 127 that are configured to align with a vent passage 137 formed through the forward edge portion of the overlying shingle frame 120A of a next higher course of solar shingles. The vent passage 137 can direct the heated air from the vent opening 127 in the pocket cover 125 out a front vent 139 formed through the front edge 136 of the overlying frame 120A. Thus, in one aspect, the shingle frame 120 for each solar roof shingle 110 can be configured to provide ventilation for the nano-inverter 160 located in the solar roof shingle 110 of the next lower course of solar roof shingles.

Figure 4:
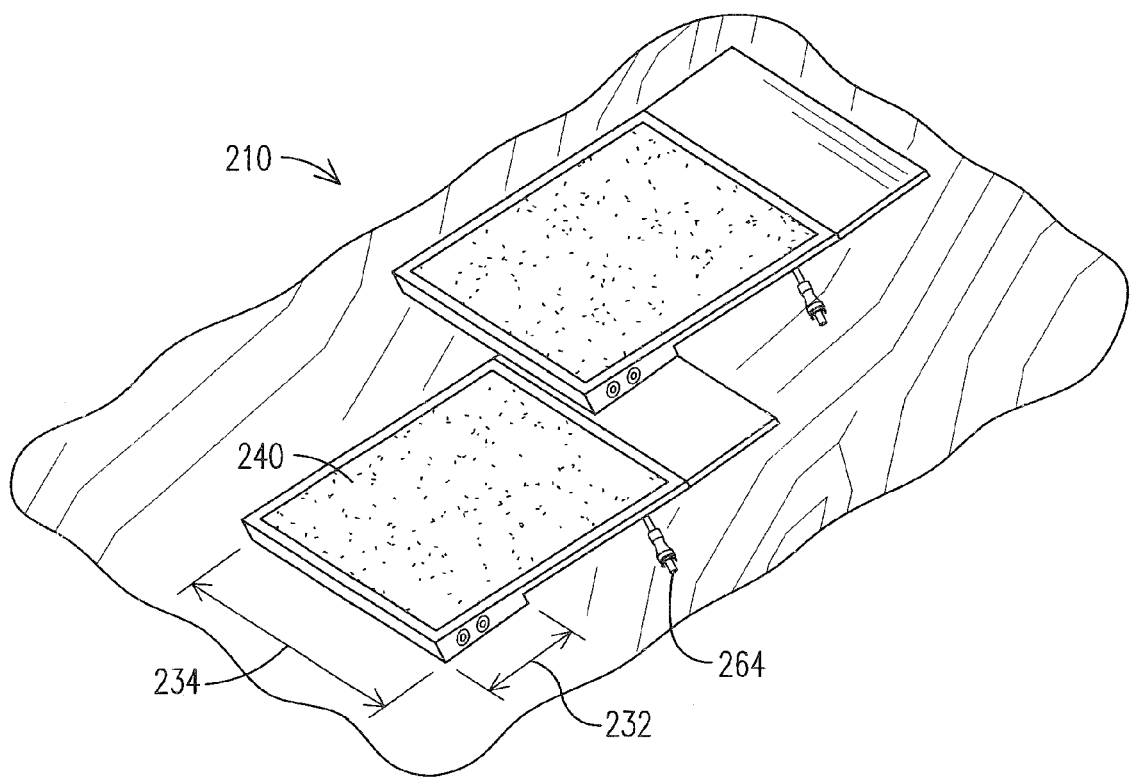
FIG. 4 is a perspective view showing two solar roof shingles of an alternate embodiment mounted in overlapping relationship on a roof deck.
Figure 5:
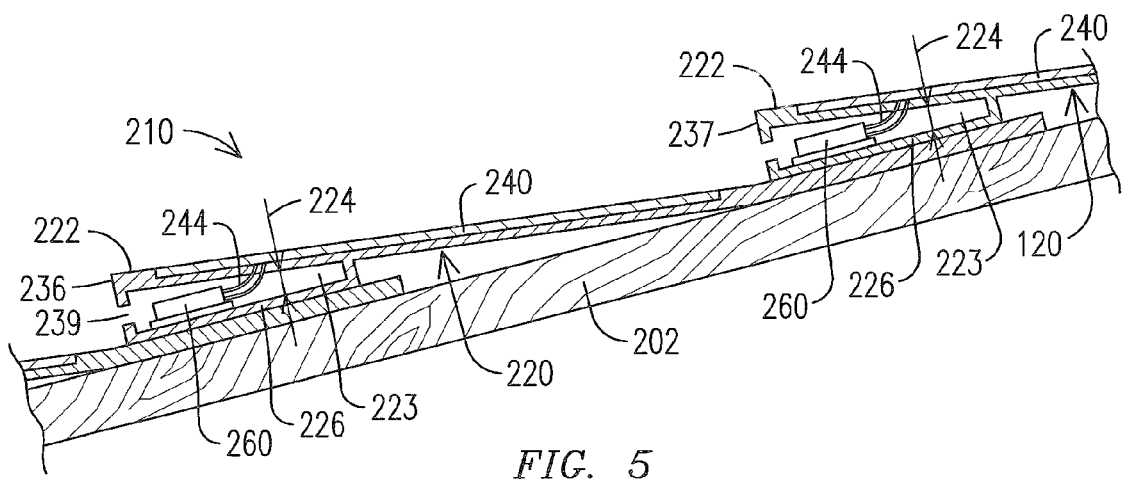
FIG. 5 is a cross-sectional schematic view showing a plurality of solar roof shingles of FIG. 4 mounted on a roof deck.

Another solution discovered by the inventors can be seen in the embodiment of the solar roof shingle 210 illustrated in FIGS. 4-5. In this embodiment, the solar roof shingle 210 also includes a shingle frame 220 having a bottom panel 226 supportable on a deck 202 of the roof, a top panel 222, and a thickness 224 between the bottom panel and the top panel. The bottom panel 226 of the shingle frame 220 can also be substantially continuous across a predetermined width 232 less than the width of the exposure portion, and a length 234 of the shingle frame 220. The top panel 222 of the frame 220 can also be substantially continuous across the width and length 234 of the shingle frame 220 to provide structural support for the solar collector mounted on the top panel as well as a continuous barrier for protecting the deck of the roof from moisture, rain and snow.

With continued reference to FIGS. 4 and 5, solar collector 240 is mounted to and covers at least most of the exposure portion of the top panel 222 that will be exposed to sunlight when the solar roof shingle is installed. The solar collector 240 produces DC electrical energy at DC terminals 244 that may extend through the shingle frame 220. The solar roof shingle 210 of this embodiment can further include a nano-inverter 260 positioned within the shingle frame 220 between the bottom panel 226 and the top panel 222 that is electrically connected to the DC terminals 244 of the solar panel 240. The nano-inverter 260 converts DC electrical energy to AC electrical energy and this energy is available at the AC couplers 264 mounted to the shingle frame 220.

In the embodiment of FIGS. 4 and 5, the shingle frame 220 of the solar roof shingle 210 can be configured so that the nano-inverter 260 may be located within a pocket 223 that is formed near the forward edge 236 of the shingle frame 220. With this configuration, heated air from around the nano-inverter 260 can be directed out a front vent 239 formed through the front edge 237 of the same shingle frame 220. Thus, in another aspect the shingle frame 220 for each solar roof shingle 210 can be configured to provide ventilation for its own nano-inverter 260 located within the shingle frame 220 between the bottom panel 226 and the top panel 222.

In both embodiments of the solar roof shingle disclosed above, the reduction in the power ratings and the resultant lower operating temperatures of the nano-inverters, in combination with the venting provided for each individual nano-inverter, may allow for a very low profile solar roof shingle compared to traditional solar panels. It has been discovered that the thickness 124, 224 of the shingle frames 120, 220, respectively, can be minimized to match more closely the thickness of standard non-solar roof shingles. For example, in one aspect, the thickness 124, 224 of the shingle frames 120, 220 can be less than two inches. In another aspect the thickness 24, 224 of the shingle frames 120, 220 can be about one inch or less. Even though the thickness of the AC solar roof shingles disclosed herein can be somewhat greater than the typical thickness of standard non-solar roof shingles, the difference nevertheless is substantially less than that of prior art solar panels. Further, as mentioned above, the solar roof shingles of this invention are configured to be mounted directly to a roof deck within a field of traditional shingles. It has been found that, despite the difference in thickness, the solar roof shingles of the present invention greatly improves the aesthetics of a hybrid roof covering system that combines non-solar roof shingles together with solar roof shingles, as illustrated in FIG. 1.

The solar shingles of this invention are installable in a manner similar to the manner in which traditional shingles are installed, except that the solar roof shingles are electrically coupled together in parallel as they are installed. Accordingly, a good roofer should be able to install the solar roof shingles of this invention with little additional training. With regard to electrical connections, each solar roof shingle may be provided with compatible electrical connectors on its ends (as shown at 170 in FIG. 2) and/or at its upper and lower edges. During installation, an installer need only snap the electrical connectors of adjacent shingles together as each shingle is installed to gang all of the solar roof shingles electrically together into an array and aggregate their individual power ratings.

The invention has been described in terms of preferred embodiments and methodologies considered by the inventors to represent the best mode of carrying out the invention. A wide variety of additions, deletions, and modification might well be made to the illustrated embodiments by skilled artisans within the spirit and scope of the invention, which is constrained only by the following claims.

What is claimed is:

1. A solar roof shingle array for producing AC electrical energy when exposed to sunlight, the solar roof shingle array comprising:
   a plurality of solar shingles installable in courses on a roof deck, each solar roof shingle comprising a shingle frame having a bottom panel supportable on a deck of a roof, a top panel, and a thickness between the bottom panel and the top panel;
   the shingle frame having an exposure portion terminating at a forward edge of the shingle frame and a headlap portion between the exposure portion and a rear edge of the shingle frame, part of the exposure portion and the forward edge being configured to overly the headlap portion of at least one like solar roof shingle in a next lower course of solar roof shingles;
   a solar collector mounted to and covering at least part of the top panel within the exposure portion of the shingle frame, the solar collector producing DC electrical energy at DC terminals when exposed to sunlight;
   a nano-inverter having inputs and outputs and being disposed within the shingle frame between the bottom panel and the top panel, the inputs of the nano-inverter being connected to the DC terminals of the solar collector;
   a ventilation opening formed through the forward edge of the shingle frame;
   the ventilation opening being positioned and configured to ventilate heat produced by a nano-inverter of the solar shingle array to ambience through the forward edge of the shingle frame;
   the nano-inverter converting the DC electrical energy to AC electrical energy available at the outputs of the nano-inverter when the solar collector is exposed to sunlight; and
   at least one electrical coupler connected to the outputs of the nano-inverter for coupling the nano-inverter electrically to nano-inverters of adjacent like solar roof shingles.

2. The solar roof shingle array of claim 1, wherein the exposure portion has a width between about 5 inches and about 8 and a length of about 36 inches.

3. The solar roof shingle array of claim 2 wherein the bottom panel of the solar roof shingle frame is substantially continuous across the length of the solar shingle.

4. The solar roof shingle array of claim 1, wherein the maximum power rating of the nano-inverter is less than 150 Watts.

5. The solar roof shingle array of claim 1, wherein the thickness of the shingle frame is less than two inches.

6. The solar roof shingle array of claim 5, wherein the thickness of the shingle frame is one inch or less.

7. The solar roof shingle array of claim 1 wherein the nano-inverter is disposed adjacent the rear edge of the shingle frame of each solar shingle and the ventilation opening through the forward edge of the shingle frame of each solar shingle aligns with the nano-inverter of a solar roof shingle in a next lower course of solar roof shingles, whereby heat generated by the nano-inverter of one solar roof shingle of the array is vented through the forward edge of like overlying solar roof shingles in a next higher course of solar roof shingles of the array.

8. The solar roof shingle array of claim 1 wherein the nano-inverter is disposed adjacent the forward edge of each shingle frame and the ventilation opening through the forward edge of the shingle frame aligns substantially with the nano-inverter, whereby heat generated by the nano-inverter is vented through the ventilation opening of the solar roof shingle in which the nano-inverter is installed.

9. The solar roof shingle array of claim 1 wherein the at least one electrical coupler comprises at least two electrical couplers.

10. The solar roof shingle array of claim 9 wherein the at least two electrical couplers are mounted on the shingle frame and arranged to couple with electrical couplers of like solar roof shingles installed in end-to-end relationship with the solar roof shingle.

11. The solar roof shingle array of claim 10 further comprising third and fourth electrical couplers mounted on the shingle body frame and arranged to couple with electrical couplers of like solar roof shingles in next higher and next lower courses of solar roof shingles.

12. The solar roof shingle of claim 1, wherein at least one of the bottom panel and top panel is substantially continuous across the width and length of the shingle frame to provide a continuous barrier for protecting the deck of the roof from moisture.

* * * * *